Figure 1:
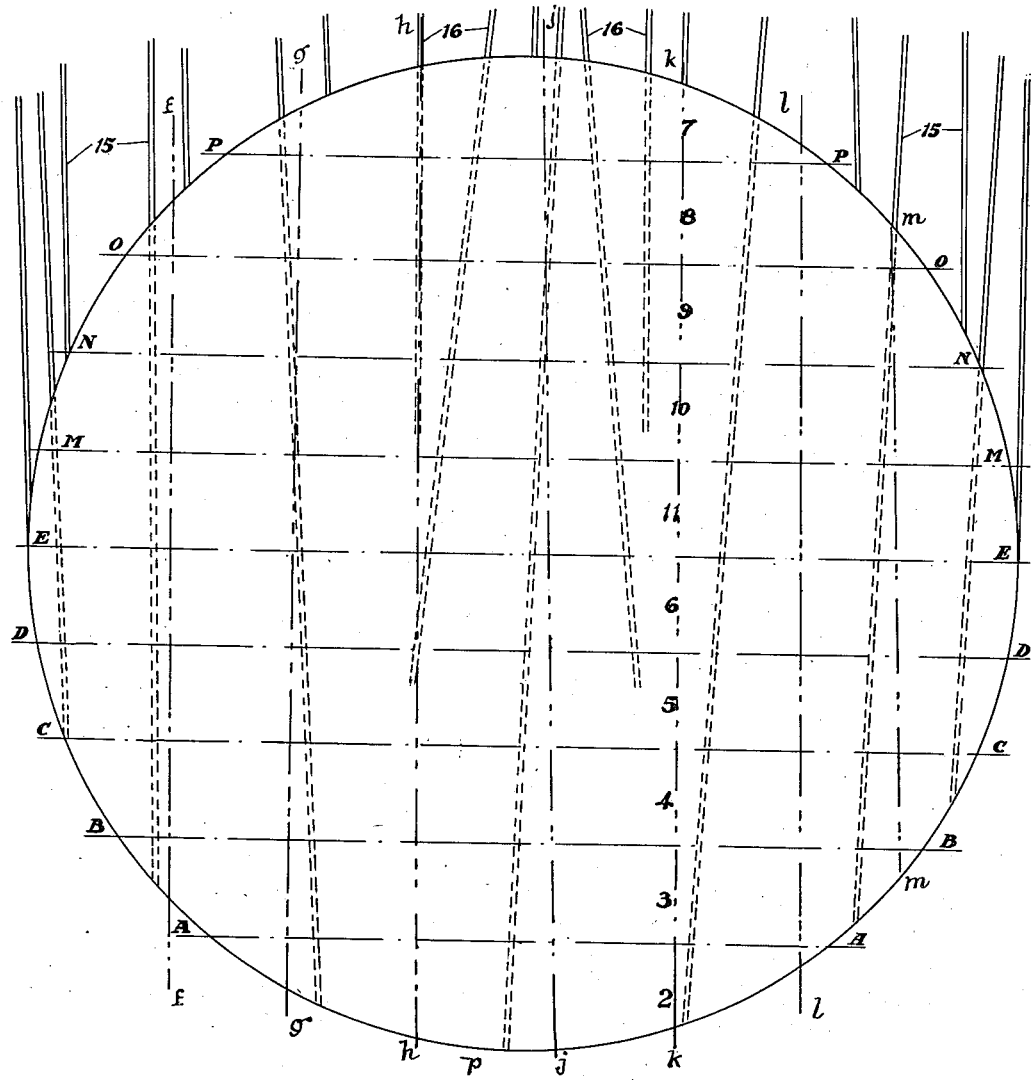

Oct. 29, 1935.   S. H. KNIGHT   2,019,437

PARACHUTE

Filed March 8, 1932    4 Sheets-Sheet 1

Samuel H. Knight  Inventor

By Mark W. Collet

Attorney

Oct. 29, 1935.  S. H. KNIGHT  2,019,437
PARACHUTE
Filed March 8, 1932  4 Sheets-Sheet 2

Inventor
Samuel H. Knight
By
Mark W. Collet
Attorney

Oct. 29, 1935.   S. H. KNIGHT   2,019,437
PARACHUTE
Filed March 8, 1932   4 Sheets-Sheet 3

Inventor
Samuel H Knight
by Mark W Collet
Attorney

Oct. 29, 1935.　　　　S. H. KNIGHT　　　　2,019,437
PARACHUTE
Filed March 8, 1932　　　4 Sheets-Sheet 4

Inventor
Samuel H. Knight
By
Mark W. Collet
Attorney

Patented Oct. 29, 1935

2,019,437

UNITED STATES PATENT OFFICE 2,019,437

PARACHUTE

Samuel H. Knight, Lancaster, Pa., assignor to Follmer, Clogg & Co. Inc., Lancaster, Pa., a corporation of New York Application March 8, 1932, Serial No. 597,563

4 Claims. (Cl. 244—21)

Hitherto the conventional parachute pack contained, when packed, the parachute, gathered into a compact mass, and placed with the apex of the parachute nearest the portions of the pack that open to permit the parachute's exit from it. In this position the parachute issued from the pack apex first. It was usually strung out by a small auxiliary parachute that was attached to the apex of the main parachute and was called the pilot parachute or wind anchor. This smaller parachute usually was opened by springs and entered the air and opened usually before the main parachute emerged from the pack. The resistance that it offered to the air pulled out the main parachute into an elongated body that was positioned vertically and with the apex up and the the mouth down. The pilot parachute did nothing to open the mouth, except to position it so that the mouth was downward. In fact, the stretching out of the parachute between such a wind anchor (the auxiliary parachute) and the load, if anything, tended to close the mouth. The opening of the mouth occurred through the entrance into it of the air swallowed by the main parachute while beginning to open through its then contracted mouth and only after sufficient velocity had been obtained. Evident objectionable features are present among which may be mentioned these.

The pilot parachute in the conventional equipment has to draw the main parachute completely out from the pack and string out its canopy into a vertical position before the latter can begin to inflate, the mouth being the last part of the canopy to emerge from the pack. Besides this, the primal entrance of the air into such a strung out canopy is upwards and does not tend to open the mouth until the upper part of the canopy is filled. The air enters into the canopy, inflating the upper portion and then draws the edges upward relatively to the parachute peak, so that the edges which, in the strung out parachute lie almost directly below the peak of the parachute and at a distance below it equal to nearly the radius of the canopy, take a position much nearer the level of its peak. The central portion of the canopy primarily forms an inflated ball at the top of the strung out canopy, the lower part near the edges remains folded closely and the spreading of this ball finally pulls the edges apart. On the other hand, the inflation of the canopy, folded according to my invention, is primarily and directly lateral, its multiple mouths starting to open immediately when the fastenings of the parachute are released.

I have found that if I pack the parachute so that the canopy will emerge mouth first, and fold the canopy in such a way that the whole periphery of the canopy, formed by its edges is presented to the air, especially when the portions of the fabric near the edges, which form the entering edges of the opening parachute are parallel, or partially so to the direction of the parachute's movement, I can produce an exceedingly prompt and quick opening of the parachute. A parachute canopy, so folded, does not require an auxiliary parachute, to help to open it. The canopy comes out mouth first from the pack and enters the air and inflates almost instantly.

The air tends to enter the interior of the canopy at once after the opening of the pack and to spread immediately the intake mouths and to drive immediately sidewise and outward the fabric near the canopy's edges in two directions.

I will describe now the best way of folding the parachute canopy to produce the results outlined above, and the folded parachute canopy produced by such folding forming the bundle or the package produced for placing in the pack.

Figure 6:
Figure 4:
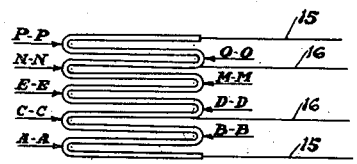
Figure 10:
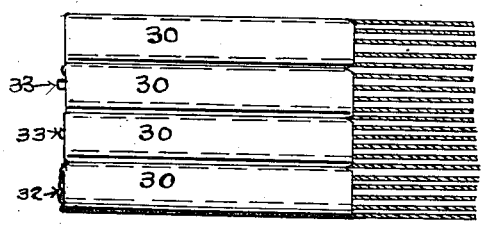
Figure 2:
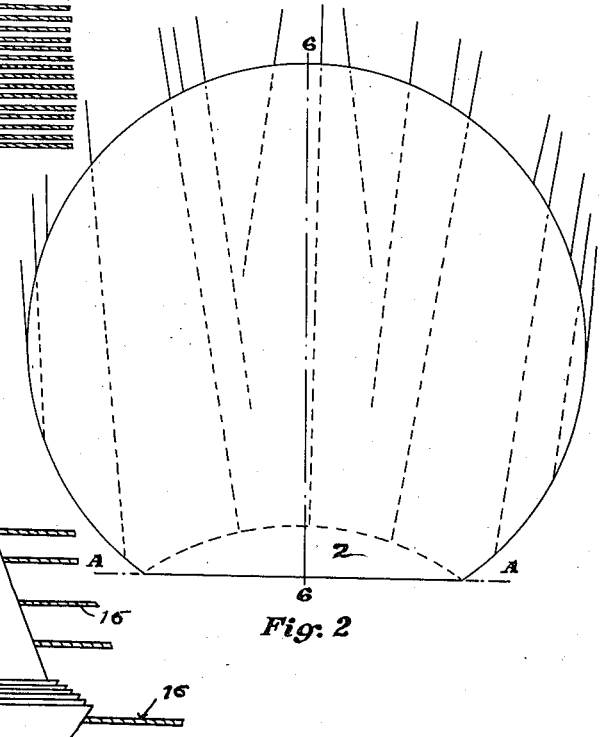
Figure 12:
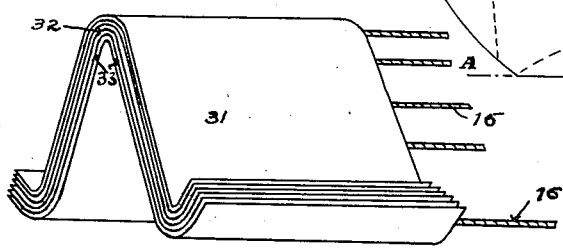
Figure 11:
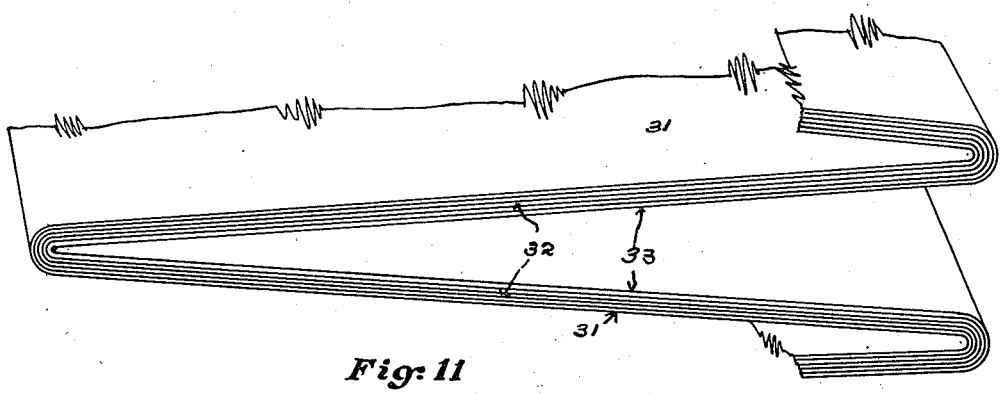
Figure 3:
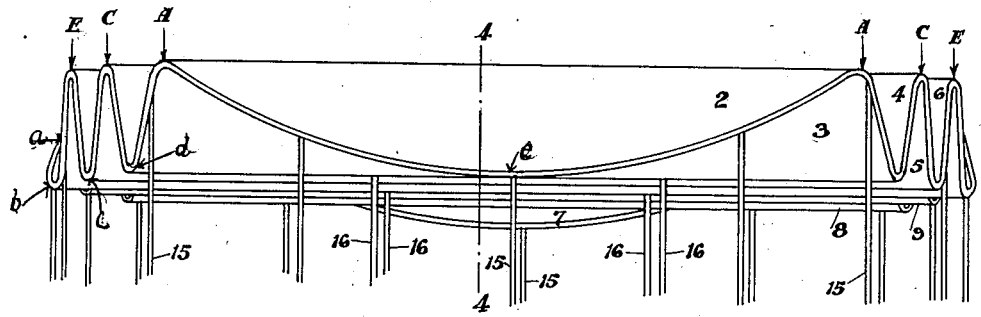
Figure 5:
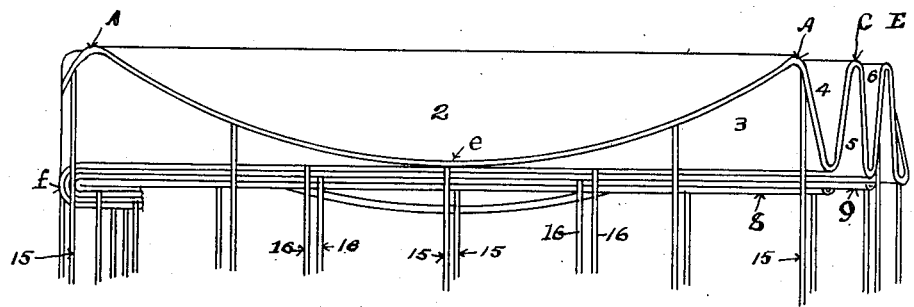
Figure 7:
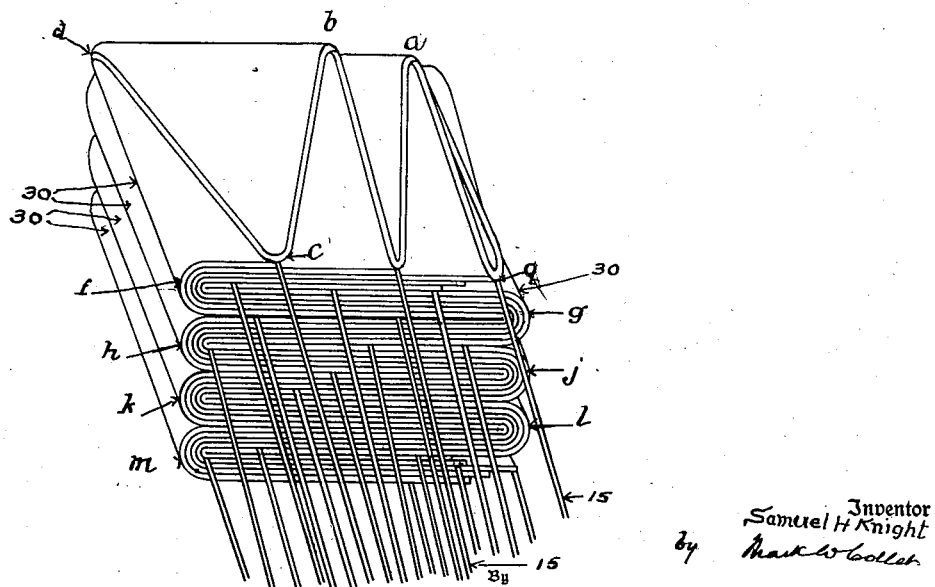
Figure 9:
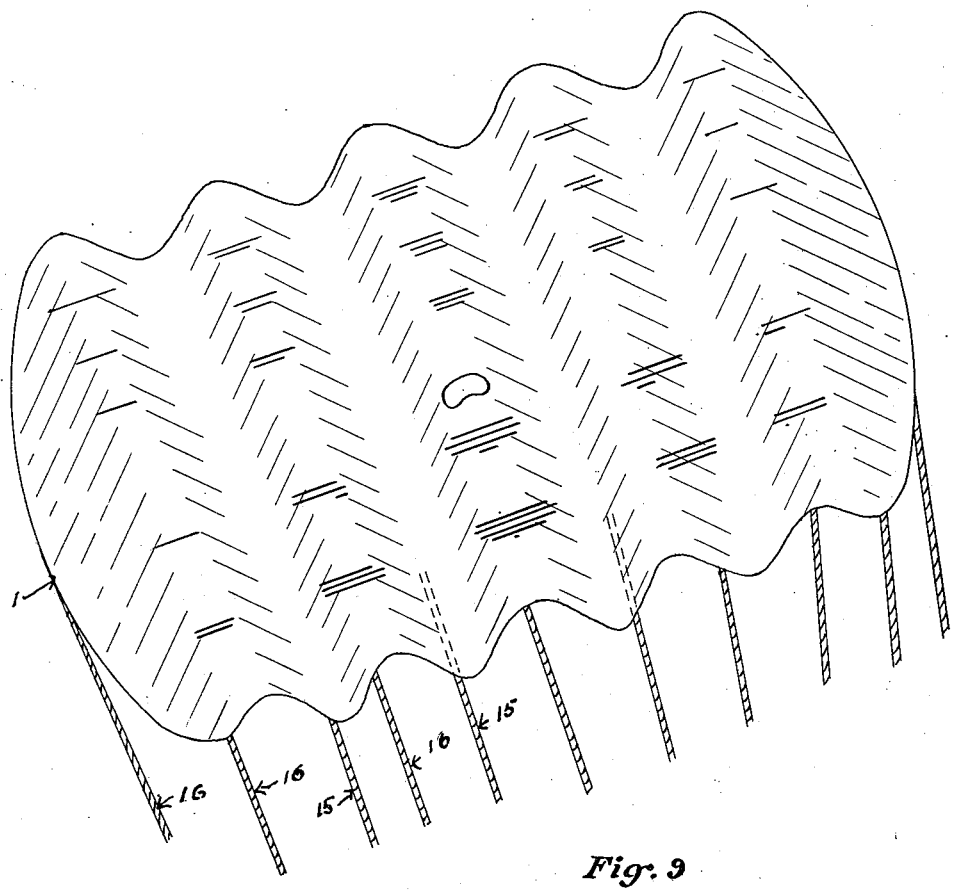
Figure 8:
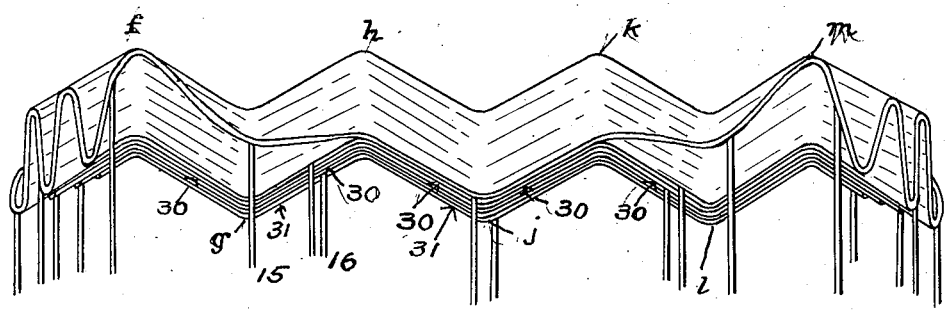

Fig. 1 is a plan view of the top of the canopy of a parachute with its canopy laid out flat and with the lines on which it is folded indicated by the lines formed by a series of dashes, the load cords lying beneath the canopy being shown in dotted lines. Fig. 2 is a sketch of a canopy with the first fold completed. Fig. 3 is a plan of a parachute canopy with the primary or long folds completed. Fig. 4 is a section on line 4—4 of Fig. 3. Fig. 5 is a plan showing the beginning of the short or secondary folds. Fig. 6 is a section on line 6—6 of Fig. 2 on an enlarged scale. Fig. 7 is a perspective view of the bundle formed of a folded canopy, viewed from nearly opposite its edges. Fig. 8 is an elevation of the position of the canopy as the opening starts. Fig. 9 is a stage of this secondary opening. Fig. 10 is a perspective view of the bundled canopy looked at from nearly opposite its folds. Fig. 11 is a fragment showing the mouth end of a portion of the bundle and Fig. 12 is a fragment showing the side opposite the mouth.

The folding of the parachute, according to my invention, can be accomplished with very many different types of canopies. The canopy that is illustrated in Fig. 1 is a canopy with a circumferential edge. I have illustrated it, however, as having load ropes 16, 16, 16, 16 that would extend to points between the circumference and the apex, as well as having the usual load ropes 15, 15, 15, 15 that extend from the periphery. The load ropes 16, 16, 16, 16 may be attached to the canopy itself, or may be attached to fins, according to the type of canopy used. The load ropes 16, 16, 16, 16 may be omitted.

The canopy 1, as illustrated in Fig. 1, is laid out flat. It is now ready for the folding by which the edges of the canopy forming its periphery will emerge first from the pack, the peak of the canopy staying back. These edges form the lips of the mouths that swallow the air. The mouths are formed by the foldings which I will now describe. The foldings are a primary and a secondary folding that produce by their conjoint action the arrangement of the entering edges and a formation of the several mouths characteristic of my invention.

In practice, the canopy is laid out flat, upper side upward, and the primary folding is begun along the line A—A, the portion 3 being folded on the segment 2. The part 2 will lie beneath part 3 when the canopy is thus folded. This folding may be performed by laying the load cords in stretched out position at one side of the canopy and drawing down the canopy until it is folded along the line A—A, and the line "B. B." lies tangentially to the inner of the edges of the parachute at P, the portion 2 being below the portion 3. (See Fig. 2.) The next folding in practice, will bring the line A—A to the line C—C, the fabric of the canopy being folded on the line B—B superimposing the parts 2, 3 and 4, the portion 4 being topmost, and the portion 3 lowermost. A third folding along the line D—D will bring the fold lines A—A and C—C across the centre of the parachute and along the line 3—3 and the parts 2, 3, 4, 5, superimposed, in the order named, 5 being uppermost and 2 lowermost.

Of course, the exact number of foldings may be varied, and the line E—E need not be exactly a diameter. The folding may then be continued until the canopy is completely folded over accordionwise, the line M—M being brought to the line A—A, and the line P—P successively, and the parts, 11, 10, 9, 8 and 7 lying on each other, 7 being uppermost. It will be noted that when the primary folding is completed, a long fold of the fabric of the canopy is produced which is, in length, the diameter of the canopy, in width the width of one of the parts 2, 3 &c. of the canopy referred to above and a thickness equal to the sum of the thicknesses of the several superposed parts 2, 3 &c. (See Fig. 4.)

The positions of the parts of the canopy after the primary folding is shown, when viewed from the side, in Fig. 3. This figure shows the folds with the folds of the fabric substantially vertical. The edges of the parachute canopy when viewed in this position follow the lines a, b, E, c, C, d, A, (see Fig. 3) of the folds, and then the unfolded edge A, c, A &c. This position of the edges is repeated on the other side of the folded canopy.

The next step, in practice, is the folding crosswise of the parachute. Fig. 5 shows the first fold made. This fold is designated by f, and this folding is continued accordion-wise, by folds g—g, h—h, j—j, k—k, l—l, m—m until the whole of the parachute canopy is folded into a substantially rectangular bundle. This bundle is shown in larger scale than in Figs. 1, 3 and 5, and in Fig. 6, and in a still larger scale than Fig. 6 in Fig. 7, and in side elevation in Fig. 10 on the scale of Fig. 7. Fragments of two layers of the bundle formed are shown in Fig. 11 showing the mouth end of the bundle, and Fig. 12 a perspective. This bundle can then be placed in the envelope in the same manner as any parachute canopy that has been bundled in any other manner.

I would now direct attention to Figs. 4, 6, 7, 10 and 11 in which is particularly shown the entire bundle into which the canopy of the parachute is folded when all the folding is completed. This complete bundle, therefore, is composed of what are substantially flattened composite folds 30, 30, 30, 30. Each fold 30 contains superimposed layers of the fabric of the canopy. These layers of fabric in each fold form a portion of the canopy that lies, in Fig. 1 between two adjacent dash two dot lines f—f, g—g, h—h, j—j, k—k, l—l, m—m drawn crosswise of the lines B—B, C—C, &c., and are, when viewed from the mouth side of the fold 30, seen to be joined and folded alternately at a fold of the edges r of the lips of each mouth in each fold 30, and at the portion of the fold 30 away from the mouth at the foldings s. Each fold 30 is therefore composed, when the parachute takes air, of what are a series of air receiving pockets, the total length of the mouths of which are equal to the sum of the lengths of the lines B—B, D—D, M—M, and P—P. So long as folds 30 remain superposed on each other the foldings f, g, h, j, &c. produce pockets into which the air enters. The air that enters these pockets must eliminate the foldings f, g, h, j, &c. by extending the folds 30 into a form approximately as shown in Fig. 8, and pushing apart and separating the layers e, e, e, e, of the fabric of the canopy. These opening impulses act crosswise to each other, each impulse acts laterally, spreading out the canopy 1 in two directions crosswise to each other horizontally.

The load cords, 15, 16, (see Figs. 7, 10 and 12 especially) are well separated from each other, and, continuously from the beginning of the inflation of the canopy, are pushed away from each other, so that they are prevented from tangling or fouling. When the load cords 16, 16 are attached to portions of the canopy back from its edges, they also separate the lips and help to begin the inflation.

The mouths of the parachute canopy therefore open into air pockets formed of a series of layers of the fabric of the parachute canopy all formed of a single piece, and laid accordion-wise on each other. These layers are continuous with each other and consequently the enclosing sheets, 31, 31, 32, 32, 33, 33, &c. forming the side sheets of each layer are continuous. Therefore the mouths of the bundle present entering edges much longer than the entire circumferential edge of the canopy fully extended and in a position most favorable for the reception of the air into the canopy.

The bundle, until launched into the air mouth downward, is bundled very solidly and firmly. From the mouth of the bundle the load cords 15, 15, 16, 16 all project and are spaced from each other and ordered regularly so that their fouling is impossible, (see Fig. 7).

The bundle I have described above may be placed in very many forms of envelopes, none of which are illustrated, as the particular form of pack or other enveloping device constitutes no limitation of my invention. The load ropes may be arranged in the pack and stowed in the pack in many different ways, no particular arrangement or system of stowage being essential to my invention. I pack them, in practice, above the canopy in stowing them in the pack. The bundle will come out of a pack when the latter is opened and will position itself mouth downward, the secondary crosswise accordion folds spreading out almost instantaneously, as indicated in Fig. 8, freeing, for the intake of the air, the whole of the entering edge which, as said above, exceeds substantially the entire periphery of the canopy and presenting a series of mouths for this purpose, some as long as the canopy and all of substantial length.

As these edges separate and the canopy inflates still further, the canopy takes a shape similar to that shown in Fig. 9.

The bundle may be placed in the pack with the side of the folds 30, 30 away from the mouths 35 toward the bottom of the pack. In this position the mouths 35 will leave the parachute first, or immediately after the load cords.

I have described in detail above the best and most satisfactory folding of the canopy of which I am aware. Changes can be made in its details and advantageous results can be attained even when a complete carrying out of the folding and of the arrangement of the bundle formed of the canopy is not accomplished. I do not limit myself therefore to these details, or the complete carrying out of my folding, or the conformation of the bundle, provided the general structure of it is reasonably followed.

I claim:—

1. A folded parachute in the form of a substantially flat quadrilaterally shaped bundle, said bundle being composed of a plurality of quadrilaterally shaped folds arranged side by side and lying parallel to each other, the adjacent folds being connected to each other at one end, each of said folds being composed of flat layers of single thicknesses of the fabric of said canopy lying parallel to, and smoothly against each other, the outside fabric layer of each fold having its free edge extending towards the same side edge of the bundle, and load cords attached to the peripheral portion of the canopy extending outwards to fall free from the parachute as it opens up.

2. A folded parachute in the form of a substantially flat quadrilaterally shaped bundle, said bundle being composed of a plurality of quadrilaterally shaped folds, arranged side by side and lying parallel to each other, the adjacent folds being connected to each other at one end, each of said folds being composed of flat layers of single thicknesses of the fabric of said canopy lying parallel to and smoothly against each other, the outside fabric layer of each fold having its free edge extending towards the same side edge of the bundle, and load cords attached to the peripheral portion of the canopy extending outwards in the same direction as the outside fabric layer of each fold.

3. The device as defined in claim 2, wherein the load cords at the points where they emerge from the bundle are spaced from each other.

4. The device as defined in claim 2, wherein the load cords at the points where they are attached to the periphery of the canopy are separated from an adjacent load cord by a flat layer of the textile fabric of the canopy.

SAMUEL H. KNIGHT.